(12) United States Patent
Mahiko et al.

(10) Patent No.: US 8,735,462 B2
(45) Date of Patent: May 27, 2014

(54) RADICAL-POLYMERIZABLE RESIN, RADICAL-POLYMERIZABLE RESIN COMPOSITION, AND CURED MATERIAL THEREOF

(75) Inventors: Tomoaki Mahiko, Himeji (JP); Yoshinori Funaki, Himeji (JP); Kiyoharu Tsutsumi, Himeji (JP); Naoko Araki, Himeji (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 13/642,363

(22) PCT Filed: Mar. 28, 2011

(86) PCT No.: PCT/JP2011/057634
§ 371 (c)(1),
(2), (4) Date: Oct. 19, 2012

(87) PCT Pub. No.: WO2011/132504
PCT Pub. Date: Oct. 27, 2011

(65) Prior Publication Data
US 2013/0030078 A1 Jan. 31, 2013

(30) Foreign Application Priority Data
Apr. 20, 2010 (JP) .................................. 2010-096945

(51) Int. Cl.
*C07D 303/40* (2006.01)
*C08F 2/46* (2006.01)
*C08G 61/04* (2006.01)

(52) U.S. Cl.
USPC ..................... 522/170; 522/168; 522/1; 520/1

(58) Field of Classification Search
USPC .................... 522/170, 168, 1; 520/1
See application file for complete search history.

(56) References Cited

U.S. PATENT DOCUMENTS 4,886,862 A * 12/1989 Kuwamura et al. ........... 526/247
2007/0299242 A1 * 12/2007 Faecke et al. ................. 528/415

FOREIGN PATENT DOCUMENTS

| JP | 2001-081182 | * | 3/2001 |
| JP | 2001-81182 | A | 3/2001 |
| JP | 2005-305371 | A | 11/2005 |
| JP | 2006-52278 | A | 2/2006 |
| JP | 2008-1901 | A | 1/2008 |
| JP | 2009-235136 | * | 10/2009 |
| JP | 2009-235136 | A | 10/2009 |

OTHER PUBLICATIONS

International Search Report for PCT/JP2011/057634 dated Jun. 28, 2011.

* cited by examiner

*Primary Examiner* — Ling-Siu Choi
*Assistant Examiner* — Jessica E Whiteley
(74) *Attorney, Agent, or Firm* — Birch, Stewart, Kolasch & Birch, LLP

(57) ABSTRACT

Provided is a radical-polymerizable resin capable of giving a cured material which is satisfactorily flexible, can relax stress upon usage as an adhesive, and does not cause disadvantages such as separation at the adhesive interface or breakage of an adherend, which stress occurs between the adhesive and the adherend upon heating or cooling and is caused by difference in coefficient of thermal expansion between them.
The radical-polymerizable resin is obtained through cationic polymerization of a compound represented by any of following Formulae (1a) and (1b) and a compound represented by any of following Formulae (2a), (2b), (2c), (2d), (2e), and (2f). The radical-polymerizable resin is liquid at 0 ° C. and has a weight-average molecular weight of 500 or more. Symbols in the formulae are as defined in the description.

[Chem. 1]

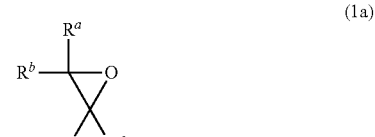

(1a)

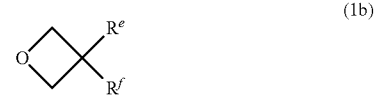

(1b)

[Chem. 2]

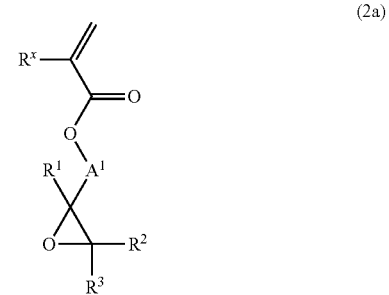

(2a)

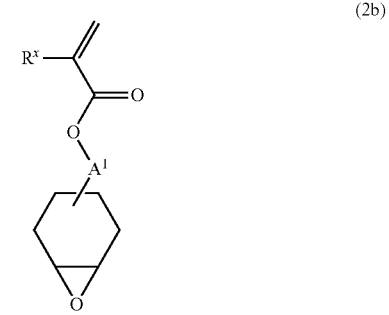

(2b)

-continued
(2c)
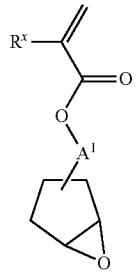
(2d)
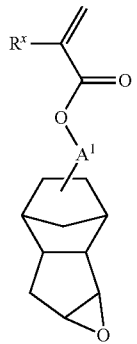
-continued
(2e)
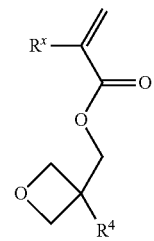
(2f)
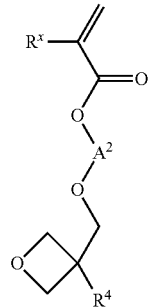
7 Claims, No Drawings

RADICAL-POLYMERIZABLE RESIN, RADICAL-POLYMERIZABLE RESIN COMPOSITION, AND CURED MATERIAL THEREOF

TECHNICAL FIELD

The present invention relates to radical-polymerizable resins (free-radically polymerizable resins or radically polymerizable resins), radical-polymerizable resin compositions, and cured materials (cured products) obtained therefrom. They are useful in the fields of stress-relaxation adhesives, waveguides (e.g., optical waveguides and hybrid substrates), optical fibers, sealants, underfill materials, ink-jet inks, color filters, nanoimprinting materials, and flexible substrates (flexible boards) and are particularly useful as stress-relaxation adhesives.

BACKGROUND ART

When an adhesive is applied to an adherend, and the adhesive includes a material having a coefficient of thermal expansion different from that of a material constituting the adherend, the two materials constituting the adhesive and the adherend thermally expand (or contract) in different degrees upon heating or cooling to cause a stress. The stress may disadvantageously cause peeling (separation) at the adhesive interface between the adhesive and the adherend. For example, such an adhesive is adopted to a recently studied technique of stacking two or more plies of a semiconductor device or wafer in a direction perpendicular to the substrate plane. According to this technique, two or more plies of a semiconductor device or a wafer are stacked and bonded with the adhesive to give a stack, and a through hole penetrating the stack is provided to form a through-silicon via. Thus, electrodes vertically connected to each other are provided with a higher degree of vertical integration. However, when a material constituting the adhesive has a coefficient of thermal expansion different from that of a material constituting the adherend semiconductor device, wafer, or through-silicon via, the two materials thermally expand (or contract) in different degrees upon heating or cooling to cause a stress. The stress may cause peeling (separation) at the adhesive interface between the adhesive and the adherend. In addition, the semiconductor device, wafer, and through-silicon via are thin-walled, fragile, and thereby liable to break when receiving external force applied as a result of heating or cooling.

According to a customary technique, an adhesive having a small difference in coefficient of thermal expansion from that of a material constituting the adherend has been employed to suppress peeling at the adhesive interface, which peeling is caused by the difference in coefficient of thermal expansion. This technique, however, should employ different adhesives from one adherend material to another and should thereby require adhesives of various types.

In contrast to this, an adhesive having sufficient flexibility, if developed, may avoid the need of employing different adhesives from one adherend material to another, because this adhesive can relax the stress which occurs between the adhesive and the adherend upon heating or cooling and which is caused by difference in thermal expansion. Patent Literature (PTL) 1 discloses a polymerizable resin composition including a polymerizable resin and a radically polymerizable monomer, in which the polymerizable resin is obtained by polymerization of monomer components containing an unsaturated monomer having an alicyclic epoxy group and/or an oxetane group in the molecule. The polymerizable resin composition, however, gives a cured material which is not sufficiently flexible and does not sufficiently relax the stress caused by difference in coefficient of thermal expansion between materials constituting the adhesive and the adherend.

CITATION LIST

Patent Literature

PTL 1: Japanese Unexamined Patent Application Publication (JP-A) No. 2001-81182

SUMMARY OF INVENTION

Technical Problem

An object of the present invention is to provide a radical-polymerizable resin, a radical-polymerizable resin composition, and a cured material thereof, in which the resin and the resin composition are capable of giving a cured material which is satisfactorily flexible, can relax stress upon usage as an adhesive, and does not cause disadvantages such as separation at the adhesive interface and breakage of the adherend, which stress occurs between the adhesive and the adherend upon heating or cooling and is caused by difference in coefficient of thermal expansion between them.

Another object of the present invention is to provide a radical-polymerizable resin, a radical-polymerizable resin composition, and a cured material thereof, in which the resin and the resin composition are capable of giving a cured material which is satisfactorily flexible and thermally stable and has excellent adhesiveness.

Solution to Problem

After intensive investigations to achieve the objects, the present inventors have found a resin which is obtained through cationic polymerization of a compound in combination with a (meth)acrylic ester, which is liquid at 0° C., and which has a weight-average molecular weight of 500 or more, in which the compound has an epoxy group or oxetanyl group with a specific structure, and the (meth)acrylic ester has an epoxy group or oxetanyl group having a specific structure. The present inventors have also found that this radical-polymerizable resin, when cured, gives a cured material which is satisfactorily flexible and can relax stress upon usage as an adhesive to remarkably less cause disadvantages such as separation at the adhesive interface and breakage of the adherend, in which the stress occurs between the adhesive and the adherend upon heating or cooling and is caused by difference in coefficient of thermal expansion between them. The present invention has been made based on these findings.

Specifically, the present invention provides a radical-polymerizable resin obtained through cationic polymerization of a first compound in combination with a second compound, the first compound being at least one compound selected from compounds each represented by one of following Formulae (1a) and (1b):

[Chem. 1]

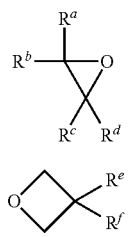
(1a)

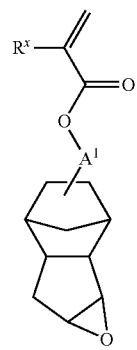
(1b)

wherein $R^a$, $R^b$, $R^c$, $R^d$, $R^e$, and $R^f$ are the same as or different from one another and each represent hydrogen atom or a hydrocarbon group having 1 to 20 carbon atoms and optionally containing an oxygen atom, where at least one of $R^a$, $R^b$, $R^c$, and $R^d$, and at least one of $R^e$ and $R^f$ are each independently a hydrocarbon group having 4 to 20 carbon atoms and optionally containing an oxygen atom, where at least two of $R^a$, $R^b$, $R^c$, and $R^d$, together with the adjacent one or two carbon atoms, may be linked to form a ring, and where $R^e$ and $R^f$, together with the adjacent carbon atom, may be linked to form a ring, and the second compound being at least one compound selected from compounds each represented by one of following Formulae (2a) to (2f):

[Chem. 2]

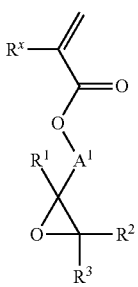
(2a)

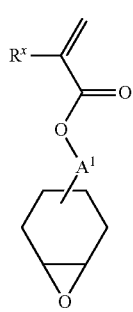
(2b)

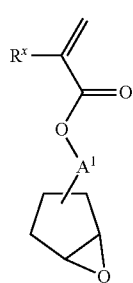
(2c)

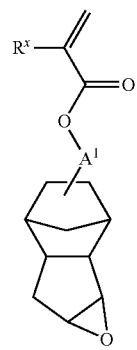
(2d)

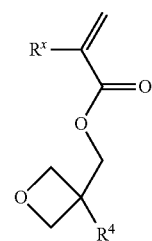
(2e)

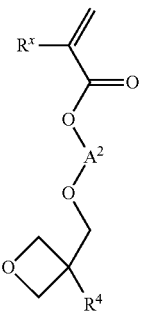
(2f)

wherein $R^x$ represents hydrogen atom or methyl group; $R^1$, $R^2$, $R^3$, and $R^4$ each independently represent hydrogen atom or a hydrocarbon group having 1 to 5 carbon atoms; $A^1$ represents single bond, an alkylene group having 1 to 5 carbon atoms, an alkyleneoxyalkylene group having 1 to 5 carbon atoms, or an alkyleneoxy group having 1 to 5 carbon atoms, where the oxygen atom of the alkyleneoxy group is bound to the ring in the formula; and $A^2$ represents an alkylene group having 1 to 3 carbon atoms. The radical-polymerizable resin is liquid at 0° C. and has a weight-average molecular weight of 500 or more.

The present invention also provides a radical-polymerizable resin composition including the radical-polymerizable resin.

The radical-polymerizable resin composition may further include an initiator for thermally-induced or energy-ray-induced radical polymerization. The initiator for thermally-induced radical polymerization is preferably an organic peroxide.

The radical-polymerizable resin composition may further include a silane coupling agent represented by following Formula (3):

[Chem. 3]

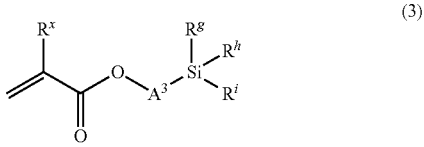

(3)

wherein $R^x$ represents hydrogen atom or methyl group; $A^3$ represents a hydrocarbon group having 1 to 20 carbon atoms; and $R^g$, $R^h$, and $R^i$ are the same as or different from one another and each represent an alkoxy group having 1 to 3 carbon atoms or an alkyl group having 1 to 3 carbon atoms, where at least one of $R^g$, $R^h$, and $R^i$ is an alkoxy group having 1 to 3 carbon atoms. The presence of the silane coupling agent may help the resin composition, upon usage as an adhesive, to have a significantly higher adhesive strength to an inorganic material as an adherend.

The radical-polymerizable resin composition may further include a radically polymerizable monomer having two to six radically polymerizable functional groups. The presence of such a multifunctional radically polymerizable monomer may help the resin composition, upon usage as an adhesive, to have a further higher adhesive strength.

The present invention further provides a cured material obtained through radical polymerization of the radical-polymerizable resin composition.

The cured material may be in the form of a film or fiber.

Advantageous Effects of Invention

The radical-polymerizable resin according to the present invention is a resin obtained through cationic polymerization of a compound having an epoxy group or oxetanyl group with a specific structure in combination with a (meth)acrylic ester having an epoxy group or oxetanyl group with a specific structure, is liquid at 0° C., and has a weight-average molecular weight of 500 or more. The radical-polymerizable resin, when subjected to radical polymerization, gives a cured material with suitably controlled intervals between crosslinking points. The cured material is therefore satisfactorily flexible even after curing. Upon usage typically as an adhesive, the cured material can relax stress and remarkably less causes disadvantages such as separation at the adhesive interface and breakage of the adherend, in which the stress occurs between the adhesive and the adherend upon heating or cooling and is caused by difference in coefficient of thermal expansion between them. The radical-polymerizable resin is cured through radical polymerization, and this eliminates the need of an acid generator to be used as a polymerization initiator and avoids disadvantages such as corrosion of circuits and substrates of electronic components, which corrosion is caused by an acid if remains. A radical-polymerizable resin composition including the radical-polymerizable resin according to the present invention gives a cured material which is satisfactorily thermally stable and flexible, and has excellent adhesiveness.

DESCRIPTION OF EMBODIMENTS

A radical-polymerizable resin according to an embodiment of the present invention is a resin obtained through cationic polymerization of at least one compound (A) and at least one (meth)acrylic ester (B), in which the at least one compound (A) is selected from compounds each represented by one of Formulae (1a) and (1b) and has an epoxy group or oxetanyl group, and the at least one (meth)acrylic ester (B) is selected from compounds each represented by one of Formulae (2a), (2b), (2c), (2d), (2e), and (2f) and has an epoxy group or oxetanyl group. The radical-polymerizable resin is liquid at 0° C. and has a weight-average molecular weight of 500 or more.

[Compound (A) Having Epoxy Group or Oxetanyl Group]

Compounds (A) having an epoxy group or oxetanyl group are each represented by one of Formulae (1a) and (1b). In Formulae (1a) and (1b), $R^a$, $R^b$, $R^c$, $R^d$, $R^e$, and $R^f$ are the same as or different from one another and each represent hydrogen atom or a hydrocarbon group having 1 to 20 carbon atoms and optionally containing an oxygen atom, where at least one of $R^a$, $R^b$, $R^c$, and $R^d$, and at least one of $R^e$ and $R^f$ are each independently a hydrocarbon group having 4 to 20 carbon atoms and optionally containing an oxygen atom. The hydrocarbon group having 1 to 20 carbon atoms is typified by aliphatic hydrocarbon groups (e.g., alkyl groups), such as methyl, ethyl, propyl, isopropyl, butyl, isobutyl, s-butyl, t-butyl, pentyl, hexyl, octyl, 2-ethylhexyl, decyl, dodecyl, tetradecyl, hexadecyl, and octadecyl groups; alicyclic hydrocarbon groups such as cyclopentyl, cyclohexyl, cyclooctyl, and cyclododecyl groups; aromatic hydrocarbon groups such as phenyl and naphthyl groups; and groups each including two or more of them bonded to each other. These hydrocarbon groups may contain oxygen atom (—O—) between carbon atoms.

At least two of $R^a$, $R^b$, $R^c$, and $R^d$, together with the adjacent one or two carbon atoms, may be linked to form a ring. Independently, $R^e$ and $R^f$, together with the adjacent carbon atom, may be linked to form a ring. Examples of such rings include monocyclic or polycyclic carbon rings having 4 to 20 carbon atoms and optionally containing an oxygen atom, such as cyclopentane ring, cyclohexane ring, cyclooctane ring, decalin ring, norbornane ring (i.e., bicyclo[2.2.1]heptane ring), 7-oxabicyclo[2.2.1]heptane ring, tricyclo[5.2.1.0$^{2,6}$]decane ring, and tricyclo[6.2.1.0$^{2,7}$]undecane ring.

The substituents $R^a$, $R^b$, $R^c$ and $R^e$ are each independently preferably hydrogen atom or an alkyl group having 1 to 4 carbon atoms. The substituents $R^d$ and $R^f$ are each independently preferably a hydrocarbon group having 4 to 20 carbon atoms and optionally containing an oxygen atom.

Of the compounds represented by Formula (1a) and having an epoxy group, preferred are compounds of Formula (1a) in which $R^a$, $R^b$, and $R^c$ are all hydrogen atoms, and $R^d$ is a hydrocarbon group having 4 to 20 carbon atoms and optionally containing an oxygen atom; and compounds of Formula (1a) in which $R^a$ and $R^d$ are each independently hydrogen atom or methyl group, and $R^b$ and $R^c$, together with the adjacent two carbon atoms, form a ring having 4 to 20 carbon atoms.

Typical examples of the compounds represented by Formula (1a) and having an epoxy group include 1,2-epoxyhexane, 1,2-epoxyheptane, 1,2-epoxyoctane, 1,2-epoxydecane, 1,2-epoxydodecane, 1,2-epoxytetradecane, 1,2-epoxytetradecane, 1,2-epoxyhexadecane, 1,2-epoxyoctadecane, 2,3-epoxyhexane, 2,3-epoxyheptane, 2,3-epoxydecane, and cyclohexene oxide.

Of the compounds represented by Formula (1b) and having an oxetanyl group, preferred are compounds of Formula (1) in which $R^e$ is hydrogen atom or an alkyl group having 1 to 4 carbon atoms (e.g., ethyl group), and $R^f$ is a hydrocarbon group having 4 to 20 carbon atoms and optionally containing an oxygen atom (e.g., oxymethyl group substituted with a hydrocarbon group having 3 to 19 carbon atoms).

Typical examples of the compounds represented by Formula (1b) and having an oxetanyl group include 3-ethyl-3-(propoxymethyl)oxetane, 3-ethyl-3-(butoxymethyl)oxetane, 3-ethyl-3-(hexyloxymethyl)oxetane, 3-ethyl-3-(2-ethylhexyloxymethyl)oxetane, 3-ethyl-3-[(phenoxy)methyl]oxetane, 3-ethyl-3-(benzyloxymethyl)oxetane, and 3-ethyl-3-(cyclohexyloxymethyl)oxetane.

[(Meth)acrylic Ester (B) having Epoxy Group or Oxetanyl Group]

(Meth)acrylic esters (B) having an epoxy group or oxetanyl group are each represented by one of Formulae (2a), (2b), (2c), (2d), (2e), and (2f). In Formulae (2a) to (2f), $R^x$ represents hydrogen atom or methyl group; $R^1$, $R^2$, $R^3$, and $R^4$ each independently represent hydrogen atom or a hydrocarbon group having 1 to 5 carbon atoms; $A^1$ represents single bond, an alkylene group having 1 to 5 carbon atoms, an alkyleneoxyalkylene group having 1 to 5 carbon atoms, or an alkyleneoxy group having 1 to 5 carbon atoms, where the oxygen atom of the alkyleneoxy group is bonded to the ring in the formula; and $A^2$ represents an alkylene group having 1 to 3 carbon atoms.

Exemplary hydrocarbon groups having 1 to 5 carbon atoms as $R^1$ to $R^4$ include aliphatic hydrocarbon groups (e.g., alkyl groups), such as methyl, ethyl, propyl, isopropyl, butyl, isobutyl, and pentyl groups; and cycloalkyl groups such as cyclopropyl, cyclobutyl, and cyclopentyl groups. Each of $R^1$ to $R^4$ is independently preferably hydrogen atom or an alkyl group having 1 to 3 carbon atoms.

As $A^1$, the alkylene group having 1 to 5 carbon atoms is typified by linear or branched chain alkylene groups having 1 to 5 carbon atoms, such as methylene, ethylene, propylene, trimethylene, tetramethylene, and pentamethylene groups. The alkyleneoxyalkylene group having 1 to 5 carbon atoms is exemplified by ethyleneoxymethylene, ethyleneoxyethylene, ethyleneoxypropylene, propyleneoxymethylene, and propyleneoxyethylene groups. The alkyleneoxy group having 1 to 5 carbon atoms, where the oxygen atom of the alkyleneoxy group is bonded to the ring in the formula, is typified by ethyleneoxy, propyleneoxy, trimethyleneoxy, tetramethyleneoxy, and pentamethyleneoxy groups.

The alkylene group having 1 to 3 carbon atoms as $A^2$ is exemplified by methylene, ethylene, propylene, and trimethylene groups.

The (meth)acrylic esters represented by Formula (2a) and having an epoxy group are typified by glycidyl (meth)acrylate. The (meth)acrylic esters represented by Formula (2b) and having an epoxy group are typified by 3,4-epoxycyclohexylmethyl (meth)acrylate. The (meth)acrylic esters represented by Formula (2c) and having an epoxy group are exemplified by 2,3-epoxycyclopentyl (meth)acrylate. The (meth) acrylic esters represented by Formula (2d) and having an epoxy group are exemplified by 3,4-epoxytricyclo[5.2.1.0$^{2,6}$]dec-8-yl (or 9-yl) (meth)acrylate and 5-[3,4-epoxytricyclo[5.2.1.0$^{2,6}$]dec-8-yl (or 9-yl)oxy]pentyl (meth)acrylate.

Exemplary (meth)acrylic esters represented by Formula (2e) and having an oxetanyl group include 3-ethyl-3-oxetanylmethyl (meth)acrylate [i.e., 3-ethyl-3-(meth) acryloyloxymethyloxetane]. Exemplary (meth)acrylic esters represented by Formula (2f) and having an oxetanyl group include 3-ethyl-3-[2-(meth)acryloyloxyethyloxymethyl]oxetane.

The radical-polymerizable resin according to the present invention is obtained through cationic polymerization of at least one compound (A) represented by one of Formulae (1a) and (1b) and having an epoxy group or oxetanyl group in combination with at least one (meth)acrylic ester (B) represented by one of Formulae (2a), (2b), (2c), (2d), (2e), and (2f) and having an epoxy group or oxetanyl group.

The ratio of the total amount of compounds (A) having an epoxy group or oxetanyl group to the total amount of (meth) acrylic esters (B) having an epoxy group or oxetanyl group is, in terms of weight ratio [(the former):(the latter)] of from 1:99 to 99:1, preferably from 20:80 to 97:3, more preferably from 40:60 to 95:5, and particularly preferably from 50:50 to 95:5. If the ratio is excessively small, the resulting resin composition may often give an insufficiently flexible cured material through radical polymerization; and, if the ratio is excessively large, the resin composition may often fail to give a cured material through radical polymerization.

The cationic polymerization reaction may be performed in the presence of a solvent. The solvent is not limited, as long as being inert to the reaction, and is typified by benzene, toluene, and xylenes.

The cationic polymerization reaction may employ a polymerization initiator. The polymerization initiator is not limited, as long as capable of inducing cationic polymerization, and can be any of known or customary cationic polymerization initiators and acid generators. These are typified by protonic acids such as perchloric acid, sulfuric acid, phosphoric acid, p-toluenesulfonic acid, trichloroacetic acid, and trifluoroacetic acid; Lewis acids such as boron trifluoride, aluminum bromide, aluminum chloride, antimony pentachloride, ferric chloride, tin tetrachloride, titanium tetrachloride, mercury chloride, and zinc chloride; as well as iodine and triphenylchloromethane. Each of them may be used alone or in combination.

The polymerization initiator may be used in the cationic polymerization reaction in an amount of typically from about 0.01 to about 50 percent by weight, and preferably from about 0.1 to about 20 percent by weight, relative to the total amount of cationically polymerizable compounds [total amount of the compounds (A) having an epoxy group or oxetanyl group and the (meth)acrylic esters (B) having an epoxy group or oxetanyl group].

The cationic polymerization reaction may be performed in the presence of a radical polymerization inhibitor. The radical polymerization inhibitor is typified by quinone/phenol inhibitors such as 4-methoxyphenol, hydroquinone, methylhydroquinone, dimethylhydroquinone, trimethylhydroquinone, hydroquinone monomethyl ether, 2,5-di-tert-butylhydroquinone, p-tert-butylcatechol, mono-t-butylhydroquinone, p-benzoquinone, naphthoquinone, 2,5-di-tert-butyl-p-cresol, α-naphthol, and nitrophenol; thioether inhibitors; and phosphite inhibitors.

During the reaction, a polymerization reaction with ring-opening proceeds between the epoxy or oxetanyl moiety of the epoxy- or oxetanyl-containing compound (A) and the epoxy or oxetanyl moiety of the epoxy- or oxetanyl-containing (meth)acrylic ester (B) to form a radical-polymerizable resin having an ethyleneoxy unit and/or a trimethyleneoxy unit in the principal chain and having a terminal (meth)acryloyloxy group.

The radical-polymerizable resin according to the present invention is liquid at 0° C. Namely, the radical-polymerizable resin is a liquid substance having fluidity at 0° C. A resin being solid at 0° C. may disadvantageously give an insufficiently flexible cured material through radical polymerization. The radical-polymerizable resin according to the present invention has a weight-average molecular weight of 500 or more (e.g., from 500 to about 500000), preferably from 550 to 200000, and more preferably from 600 to 100000. A radical-polymerizable resin having a weight-average molecular weight of less than 500 may not be cured through radical polymerization.

[Radical-polymerizable Resin Composition]

A radical-polymerizable resin composition according to an embodiment of the present invention includes the radical-polymerizable resin as a radically polymerizable compound.

The radical-polymerizable resin composition includes the radical-polymerizable resin in a content of typically 5 percent by weight or more and may substantially include the radical-polymerizable resin alone. For the formation of a more flexible cured material, the radical-polymerizable resin composition includes the radical-polymerizable resin in a content of preferably 10 percent by weight or more, more preferably 30 percent by weight or more (e.g., from 30 to 99.9 percent by weight), and particularly preferably 60 percent by weight or more (e.g., from 60 to 95 percent by weight). The radical-polymerizable resin composition, if including the radical-polymerizable resin in a content of less than 5 percent by weight, may give an insufficiently flexible cured material by curing through radical polymerization.

The radical-polymerizable resin composition according to the present invention may include, as a radically polymerizable compound, the radical-polymerizable resin alone or in combination with another radically polymerizable compound than the radical-polymerizable resin. Typically, the radical-polymerizable resin composition may contain another radically polymerizable compound (hereinafter also referred to as "other radically polymerizable compound") than the radical-polymerizable resin and the compounds represented by Formulae (2a), (2b), (2c), (2d), (2e), and (2f).

The radical-polymerizable resin accounts for typically 20 percent by weight or more, preferably 40 percent by weight or more, and more preferably 60 percent by weight or more (e.g., from 60 to 95 percent by weight) of the total amount of radically polymerizable compounds in the radical-polymerizable resin composition.

The other radically polymerizable compound is exemplified by compounds having one or more radically polymerizable groups such as (meth)acryloyl groups, (meth)acryloyloxy groups, (meth)acryloylamino groups, vinylaryl groups, vinyl ether groups, and vinyloxycarbonyl groups, per molecule.

Exemplary compounds having one or more (meth)acryloyloxy groups per molecule include methyl (meth)acrylate, ethyl (meth)acrylate, n-butyl (meth)acrylate, isobutyl (meth)acrylate, t-butyl methacrylate, 2-ethylhexyl (meth)acrylate, isodecyl (meth)acrylate, n-lauryl (meth)acrylate, n-stearyl (meth)acrylate, n-butoxyethyl (meth)acrylate, butoxydiethylene glycol (meth)acrylate, methoxytriethylene glycol (meth)acrylate, methoxypolyethylene glycol (meth)acrylates, cyclohexyl (meth)acrylate, n-hexyl (meth)acrylate, tetrahydrofurfuryl (meth)acrylate, benzyl (meth)acrylate, phenoxyethyl (meth)acrylate, isobonyl (meth)acrylate, 2-hydroxyethyl (meth)acrylate, 2-hydroxypropyl (meth)acrylate, 2-hydroxybutyl (meth)acrylate, dimethylaminoethyl (meth)acrylate, diethylaminoethyl (meth)acrylate, methacrylic acid, 2-methacryloyloxyethyl succinate, 2-methacryloyloxyethyl hexahydrophthalate, 2-methacryloyloxyethyl-2-hydroxypropyl phthalate, 2-methacryloyloxyethyl acid phosphate (2-hydroxyethyl methacrylate phosphate), ethylene glycol di(meth)acrylate, diethylene glycol di(meth)acrylate, triethylene glycol di(meth)acrylate, 1,4-butanediol di(meth)acrylate, neopentyl glycol di(meth)acrylate, 1,6-hexanediol di(meth)acrylate, 1,9-nonanediol di(meth)acrylate, 1,10-decanediol di(meth)acrylate, glycerol di(meth)acrylate, 2-hydroxy-3-acryloyloxypropyl (meth) acrylate, dimethyloltricyclodecane di(meth)acrylate, trifluoroethyl (meth)acrylate, perfluorooctylethyl (meth)acrylate, isoamyl (meth)acrylate, isomyristyl (meth)acrylate, 2-(meth) acryloyloxyethyl isocyanate, 1,1-bis(acryloyloxy)ethyl isocyanate, and 2-(2-methacryloyloxyethyloxy)ethyl isocyanate; as well as derivatives of them.

The compounds having one or more (meth)acryloyloxy groups per molecule include the silane coupling agent represented by Formula (3). In Formula (3), $R^x$ represents hydrogen atom or methyl group; $A^3$ represents a hydrocarbon group having 1 to 20 carbon atoms; and $R^g$, $R^h$, and $R^i$ are the same as or different from one another and each represent an alkoxy group having 1 to 3 carbon atoms or an alkyl group having 1 to 3 carbon atoms, where at least one of $R^g$, $R^h$, and $R^i$ is an alkoxy group having 1 to 3 carbon atoms.

The hydrocarbon group having 1 to 20 carbon atoms as $A^3$ is typified by linear or branched chain alkylene groups such as methylene, ethylene, propylene, trimethylene, tetramethylene, pentamethylene, hexamethylene, octamethylene, decamethylene, tetradecamethylene, and hexadecamethylene groups; cycloalkylene groups such as cyclopentylene and cyclohexylene groups; arylene groups such as phenylene group; and divalent hydrocarbon groups each including two or more of these bonded to each other. As $R^g$, $R^h$, and $R^i$, the alkoxy group having 1 to 3 carbon atoms is exemplified by methoxy, ethoxy, propoxy, and isopropoxy groups; and the alkyl group having 1 to 3 carbon atoms is exemplified by methyl, ethyl, propyl, and isopropyl groups.

Typical examples of the silane coupling agent represented by Formula (3) include 3-(meth)acryloyloxypropyltrimethoxysilane, 3-(meth)acryloyloxypropyltriethoxysilane, 3-(meth)acryloyloxypropyldimethoxymethylsilane, and 3-(meth)acryloyloxypropylmethoxydimethylsilane.

Exemplary compounds having one or more (meth)acryloylamino groups per molecule include (meth) acryloylmorpholine, N,N-dimethylacrylamide, N,N-diethylacrylamide, N-methylacrylamide, N-ethylacrylamide, N-propylacrylamide, N-isopropylacrylamide, N-butylacrylamide, N-n-butoxymethylacrylamide, N-hexylacrylamide, and N-octylacrylamide; as well as derivatives of them.

Exemplary compounds having one or more vinylaryl groups per molecule include styrene, divinylbenzene, methoxystyrene, ethoxystyrene, hydroxystyrene, vinylnaphthalene, vinylanthracene, 4-vinylphenyl acetate, (4-vinylphenyl)dihydroxyborane, (4-vinylphenyl)boranic acid, (4-vinylphenyl)boronic acid, 4-ethenyiphenylboronic acid, 4-vinylphenylboranic acid, 4-vinylphenylboronic acid, p-vinylphenylboric acid, p-vinylphenylboronic acid, N-(4-vinylphenyl)maleimide, N-(p-vinylphenyl)maleimide, and N-(p-vinylphenyl)maleimide; as well as derivatives of them.

Exemplary compounds having one or more vinyl ether groups per molecule include 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,4-cyclohexanedimethanol monovinyl ether, 1,3-cyclohexanedimethanol monovinyl ether, 1,2-cyclohexanedimethanol monovinyl ether, p-xylene glycol monovinyl ether, m-xylene glycol monovinyl ether, o-xylene glycol monovinyl ether, diethylene glycol monovinyl ether, triethylene glycol monovinyl ether, tetraethylene glycol monovinyl ether, pentaethylene glycol monovinyl ether, oligoethylene glycol monovinyl ethers, polyethylene glycol monovinyl ethers, dipropylene glycol monovinyl ether, tripropylene glycol monovinyl ether, tetrapropylene glycol monovinyl ether, pentapropylene glycol monovinyl ether, oligopropylene glycol monovinyl ethers, and polypropylene glycol monovinyl ethers; as well as derivatives of them.

Exemplary compounds having one or more vinyloxycarbonyl groups per molecule include isopropenyl formate, isopropenyl acetate, isopropenyl propionate, isopropenyl butyrate, isopropenyl isobutyrate, isopropenyl caproate, isopropenyl valerate, isopropenyl isovalerate, isopropenyl lactate, vinyl acetate, vinyl propionate, vinyl butyrate, vinyl caproate, vinyl caprylate, vinyl laurate, vinyl myristate, vinyl palmitate, vinyl stearate, vinyl cyclohexanecarboxylate, vinyl pivalate, vinyl octanoate, vinyl monochloroacetate, divinyl adipate, vinyl methacrylate, vinyl crotonate, vinyl sorbate, vinyl benzoate, and vinyl cinnamate; as well as derivatives of them.

Of other radically polymerizable compounds for use herein, preferred are radically polymerizable monomers each having two or more (e.g., two to six) radically polymerizable functional groups, such as ethylene glycol di(meth)acrylate, diethylene glycol di(meth)acrylate, triethylene glycol di(meth)acrylate, 1,4-butanediol di(meth)acrylate, neopentyl glycol di(meth)acrylate, 1,6-hexanediol di(meth)acrylate, 1,9-nonanediol di(meth)acrylate, 1,10-decanediol di(meth)acrylate, and glycerol di(meth)acrylate; of which multifunctional acrylic monomers are more preferred. These compounds are preferred for the formation of a cured material having a higher adhesive strength. Each of them may be used alone or in combination.

The radical-polymerizable resin composition may contain the radically polymerizable monomer having two or more (e.g., two to six) radically polymerizable functional groups in an amount of typically from 1 to 50 percent by weight, preferably from 5 to 40 percent by weight, and more preferably from 8 to 30 percent by weight, based on the total amount of radically polymerizable compounds in the composition.

The radical-polymerizable resin composition herein may contain a silane coupling agent represented by Formula (3) as the other radically polymerizable compound. The silane coupling agent, when added, helps the resin composition to give a cured material having a further higher adhesive strength to an inorganic material.

The radical-polymerizable resin composition may contain the silane coupling agent represented by Formula (3) in an amount of typically from 0.01 to 10 percent by weight, preferably from 0.1 to 5 percent by weight, and more preferably from 0.3 to 3 percent by weight, based on the total amount of radically polymerizable compounds in the resin composition.

The radical-polymerizable resin composition according to the present invention may include, but not exclusively, a polymerization initiator. The polymerization initiator can be any one, as long as capable of inducing radical polymerization, and is typified by known or customary initiators for thermally-induced polymerization (thermal polymerization initiators) and initiators for energy-ray-induced polymerization (energy-ray-induced polymerization initiators).

Exemplary thermal polymerization initiators include organic peroxides and azo compounds (azo radical-polymerization initiators). The organic peroxides are exemplified by ketone peroxides, diacyl peroxides (e.g., benzoyl peroxide), hydroperoxides, dialkyl peroxides, peroxy ketals, alkyl peresters, and percarbonates. The azo compounds are typified by azobisisobutyronitrile (AIBN), azobis-2,4-dimethylvaleronitrile, and dimethyl 2,2'-azobis(isobutyrate).

Among them, preferred are peroxide radical-polymerization initiators including organic peroxides, of which diacyl peroxides (e.g., benzoyl peroxide) are more preferred. A peroxide radical-polymerization initiator, when used, helps the radical-polymerizable resin composition to be cured without occurrence of bubbles and thus enables fine and firm adhesion of an adherend. An azo radical-polymerization initiator, if employed, may cause the radical-polymerizable resin composition to be cured with occurrence of bubbles.

The energy-ray-induced polymerization initiators are typified by benzophenone, acetophenone benzil, benzil dimethyl ketone, benzoin, benzoin methyl ether, benzoin ethyl ether, benzoin isopropyl ether, dimethoxyacetophenone, dimethoxyphenylacetophenone, diethoxyacetophenone, and diphenyl disulfite. Each of them may be used alone or in combination.

The polymerization initiator may be used in combination with a synergistic agent to enhance the conversion of photoadsorbed energy to polymerization-initiating free radicals. The synergistic agent is typified by amines such as triethylamine, diethylamine, diethanolamine, ethanolamine, dimethylaminobenzoic acid, and methyl dimethylaminobenzoate; and ketones such as thioxanthone, 2-isopropylthioxanthone, 2,4-diethylthioxanthone, and acetylacetone.

The radical-polymerizable resin composition contains, if any, a polymerization initiator in an amount of from about 0.01 to about 50 percent by weight, and preferably from about 0.1 to about 20 percent by weight, relative to the total amount of radically polymerizable compounds (total weight of the radical-polymerizable resin and the other radically polymerizable compounds) in the radical-polymerizable resin composition.

The radical-polymerizable resin composition according to the present invention may further contain other additives according to necessity, within ranges not adversely affecting advantageous effects of the present invention. Exemplary other additives include known or customary additives such as setting-expandable monomers, photosensitizers (e.g., anthracene sensitizers), resins, adhesion promoters, reinforcers, softeners, plasticizers, viscosity modifiers, solvents, inorganic or organic particles (e.g., nano-scale particles), and fluorosilanes.

The radical-polymerizable resin composition according to the present invention can form a cured material when subjected to a heating treatment and/or irradiation with an energy ray to promote the radical polymerization reaction. The heating treatment, when employed, may be performed at a temperature of typically from about 20° C. to about 200° C., preferably from about 50° C. to about 150° C., and more preferably from about 70° C. to about 120° C. The temperature, however, may be suitably controlled according to the types of components to be reacted and of a catalyst. The irradiation with an energy ray, when employed, may use any of light sources such as mercury lamps, xenon lamps, carbon arc lamps, metal halide lamps, sunlight, electron beams, laser beams, radiation, and X-rays. The irradiation with an energy ray may be followed by a heating treatment at a temperature of typically from about 50° C. to about 180° C. to allow curing to proceed.

The radical polymerization reaction may be performed under normal atmospheric pressure, under reduced pressure, or under a pressure (under a load). The reaction may be performed in any atmosphere, such as air atmosphere, nitrogen atmosphere, or argon atmosphere, as long as not adversely affecting the reaction.

The cured material obtained through radical polymerization of the radical-polymerizable resin composition according to the present invention is not limited in shape or form and may for example be in the form of a film or fiber. A cured material in the form of a film (film-like cured material) can be produced typically by applying the radical-polymerizable resin composition to a substrate (base material) using an applicator so as to have a uniform thickness, and applying heat and/or an energy ray to promote the radical polymerization reaction. A cured material in the form of a fiber (fibrous cured material) can be produced typically by quantitatively extruding the radical-polymerizable resin composition using a syringe, and applying heat and/or an energy ray to the extruded radical-polymerizable resin composition to promote the radical polymerization reaction.

The resulting cured material has excellent adhesiveness and is satisfactorily flexible. The radical-polymerizable resin composition according to the present invention is therefore useful particularly as a stress-relaxation adhesive. For satisfactory flexibility and excellent thermal stability of the cured material, the radical-polymerizable resin composition is also useful in the fields typically of waveguides (e.g., optical waveguides and hybrid substrates), optical fibers, sealants, underfill materials, ink-jet inks, color filters, nanoimprinting materials, and flexible substrates and is particularly useful in the fields of flexible optical waveguides, flexible adhesives, and underfill materials.

EXAMPLES

The present invention will be illustrated in further detail with reference to several working examples below. It should be noted, however, that these examples are never construed to limit the scope of the present invention.

Example 1

Production of Radical-polymerizable Resin

A mixture (monomer mixture) of 9.28 g of toluene, 4.41 g (34.4 mmol) of glycidyl acrylate (GA), 17.2 g (172 mmol) of 1,2-epoxyhexane, and 0.0385 g of p-methoxyphenol was placed in a three-necked flask equipped with an initiator-dropping line, a $N_2$ line, and a thermometer, followed by temperature adjustment to 25° C. Next, a mixture of 5.60 g of toluene and 0.95 g (6.60 mmol) of boron trifluoride diethyl etherate ($BF_3OEt_2$) was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C1).

The resin (C1) had a number-average molecular weight (Mn) of 600 and a weight-average molecular weight (Mw) of 900 as molecular weights measured through gel permeation chromatography (GPC). The resin remained liquid even at 0° C.

Example 2

Production of Radical-polymerizable Resin

A mixture (monomer mixture) of 10.3 g of toluene, 6.76 g (34.4 mmol) of 3,4-epoxycyclohexylmethyl methacrylate (trade name "CYCLOMER M-100," supplied by Daicel Chemical Industries, Ltd. (now Daicel Corporation)), 17.2 g (172 mmol) of 1,2-epoxyhexane, and 0.0385 g of p-methoxyphenol was placed in a three-necked flask equipped with an initiator-dropping line, a $N_2$ line, and a thermometer, followed by temperature adjustment to 25° C. Next, a mixture of 5.60 g of toluene and 0.95 g (6.60 mmol) of $BE_3OEt_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C2).

The resin (C2) had an Mn of 500 and an Mw of 800 as molecular weights measured by GPC. The resin remained liquid even at 0° C.

Example 3

Production of Radical-polymerizable Resin

A mixture (monomer mixture) of 9.90 g of toluene, 5.86 g (34.4 mmol) of 3-ethyl-3-oxetanylmethyl acrylate (trade name "OXE-10," supplied by Osaka Organic Chemical Industry Ltd.), 17.2 g (172 mmol) of 1,2-epoxyhexane, 0.0385 g of p-methoxyphenol was placed in a three-necked flask equipped with an initiator-dropping line, a $N_2$ line, and a thermometer, followed by temperature adjustment to 25° C. Next, a mixture of 5.60 g of toluene and 0.95 g (6.60 mmol) of $BF_3OEt_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C3).

The resin (C3) had an Mn of 5000 and an Mw of 8500 as molecular weights measured by GPC. The resin remained liquid even at 0° C.

Example 4

Production of Radical-polymerizable Resin

A mixture (monomer mixture) of 10.5 g of toluene, 7.37 g (34.4 mmol) of 3-ethyl-3-(2-acryloyloxyethyloxymethyl)oxetane ("OXT-C2") synthetically prepared according to a known procedure, 17.2 g (172 mmol) of 1,2-epoxyhexane, and 0.0385 g of p-methoxyphenol was placed in a three-necked flask equipped with an initiator-dropping line, a $N_2$ line, and a thermometer, followed by temperature adjustment to 25° C. Next, a mixture of 5.60 g of toluene and 0.95 g (6.60 mmol) of $BF_3OEt_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C4).

The resin (C4) had an Mn of 5600 and an Mw of 9200 as molecular weights measured by GPC. The resin remained liquid even at 0° C.

Example 5

Production of Radical-polymerizable Resin

A mixture (monomer mixture) of 18.7 g of toluene, 4.41 g (34.4 mmol) of GA, 39.3 g (172 mmol) of 3-ethyl-3-(2-ethylhexyloxymethyl)oxetane (trade name "OXT-212," supplied by Toagosei Co., Ltd.), and 0.0385 g of p-methoxyphenol was placed in a three-necked flask equipped with an initiator-dropping line, a N₂ line, and a thermometer, followed by temperature adjustment to 25° C. Next, a mixture of 5.60 g of toluene and 0.95 g (6.60 mmol) of $BF_3OEt_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C5).

The resin (C5) had an Mn of 4400 and an Mw of 8500 as molecular weights measured by GPC. The resin remained liquid even at 0° C.

Example 6

Production of Radical-polymerizable Resin

A mixture (monomer mixture) of 19.7 g of toluene, 6.76 g (34.4 mmol) of "CYCLOMER M-100," 39.3 g (172 mmol) of "OXT-212," and 0.0385 g of p-methoxyphenol was placed in a three-necked flask equipped with an initiator-dropping line, a N₂ line, and a thermometer, followed by temperature adjustment to 25° C. Next, a mixture of 5.60 g of toluene and 0.95 g (6.60 mmol) of $BF_3OEt_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C6).

The resin (C6) had an Mn of 3800 and an Mw of 8300 as molecular weights measured by GPC. The resin remained liquid even at 0° C.

Example 7

Production of Radical-polymerizable Resin

A mixture (monomer mixture) of 19.3 g of toluene, 5.86 g (34.4 mmol) of "OXE-10," 39.3 g (172 mmol) of "OXT-212," and 0.0385 g of p-methoxyphenol was placed in a three-necked flask equipped with an initiator-dropping line, a N₂ line, and a thermometer, followed by temperature adjustment to 25° C. Next, a mixture of 5.60 g of toluene and 0.95 g (6.60 mmol) of $BF_3OEt_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C7).

The resin (C7) had an Mn of 4500 and an Mw of 7000 as molecular weights measured by GPC. The resin remained liquid even at 0° C.

Example 8

Production of Radical-polymerizable Resin

A mixture (monomer mixture) of 19.3 g of toluene, 6.34 g (34.4 mmol) of 3-ethyl-3-oxetanylmethyl methacrylate (trade name "OXE-30," supplied by Osaka Organic Chemical Industry Ltd.), 39.2 g (172 mmol) of "OXT-212," and 0.0385 g of p-methoxyphenol was placed in a three-necked flask equipped with an initiator-dropping line, a N₂ line, and a thermometer, followed by temperature adjustment to 25° C. Next, a mixture of 5.60 g of toluene and 0.95 g (6.60 mmol) of $BF_3OEt_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C8).

The resin (C8) had an Mn of 3600 and an Mw of 5100 as molecular weights measured by GPC. The resin remained liquid even at 0° C.

Example 9

Production of Radical-polymerizable Resin

A mixture (monomer mixture) of 20.0 g of toluene, 7.37 g (34.4 mmol) of "OXT-C2," 39.3 g (172 mmol) of "OXT-212," and 0.0385 g of p-methoxyphenol was placed in a three-necked flask equipped with an initiator-dropping line, a N₂ line, and a thermometer, followed by temperature adjustment to 25° C. Next, a mixture of 5.60 g of toluene and 0.95 g (6.60 mmol) of $BF_3OEt_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C9).

The resin (C9) had an Mn of 23300 and an Mw of 40900 as molecular weights measured by GPC. The resin remained liquid even at 0° C.

Comparative Example 1

Production of Radical-polymerizable Resin

A mixture (monomer mixture) of 1.89 g of toluene, 4.41 g (34.4 mmol) of GA, and 0.0385 g of p-methoxyphenol was placed in a three-necked flask equipped with an initiator-dropping line, a N₂ line, and a thermometer, followed by temperature adjustment to 25° C. Next, a mixture of 5.60 g of toluene and 0.95 g (6.60 mmol) of $BF_3OEt_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C10).

The resin (C10) had an Mn of 450 and an Mw of 700 as molecular weights measured by GPC.

Comparative Example 2

Production of Radical-polymerizable Resin

A mixture (monomer mixture) of 2.90 g of toluene, 6.76 g (34.4 mmol) of "CYCLOMER M-100," and 0.0385 g of p-methoxyphenol was placed in a three-necked flask equipped with an initiator-dropping line, a N₂ line, and a thermometer, followed by temperature adjustment to 25° C. Next, a mixture of 5.60 g of toluene and 0.95 g (6.60 mmol)

of BF$_3$OEt$_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C11).

The resin (C11) had an Mn of 550 and an Mw of 850 as molecular weights measured by GPC.

Comparative Example 3

Production of Radical-polymerizable Resin

A mixture (monomer mixture) of 2.51 g of toluene, 5.86 g (34.4 mmol) of "OXE-10," and 0.0385 g of p-methoxyphenol was placed in a three-necked flask equipped with an initiator-dropping line, a N$_2$ line, and a thermometer, followed by temperature adjustment to 25° C. Next, a mixture of 5.60 g of toluene and 0.95 g (6.60 mmol) of BF$_3$OEt$_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C12).

The resin (C12) had an Mn of 4000 and an Mw of 7500 as molecular weights measured by GPC.

Comparative Example 4

Production of Radical-polymerizable Resin

A mixture (monomer mixture) of 2.72 g of toluene, 6.34 g (34.4 mmol) of "OXE-30," and 0.0385 g of p-methoxyphenol was placed in a three-necked flask equipped with an initiator-dropping line, a N$_2$ line, and a thermometer, followed by temperature adjustment to 25° C. Next, a mixture of 5.60 g of toluene and 0.95 g (6.60 mmol) of BF$_3$OEt$_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C13).

The resin (C13) had an Mn of 3600 and an Mw of 4000 as molecular weights measured by GPC.

Comparative Example 5

Production of Radical-polymerizable Resin

A mixture (monomer mixture) of 3.16 g of toluene, 7.37 g (34.4 mmol) of "OXT-C2," and 0.0385 g of p-methoxyphenol was placed in a three-necked flask equipped with an initiator-dropping line, a N$_2$ line, and a thermometer, followed by temperature adjustment to 25° C. Next, a mixture of 5.60 g of toluene and 0.95 g (6.60 mmol) of BF$_3$OEt$_2$ was quantitatively added dropwise over 2 hours using a delivery pump. The resulting mixture after the completion of dropwise addition was held for 4 hours to yield a resin composition. This was purified by precipitation from five times the amount of methanol (containing 0.1% of p-methoxyphenol), held in a vacuum dryer (40° C., full vacuum) for 20 hours, and yielded a colorless, transparent liquid resin (C14):

The resin (C14) had an Mn of 19000 and an Mw of 39000 as molecular weights measured by GPC.

Examples 10 to 45 and Comparative Examples 6 to 15

Preparation of Thermally-induced Radical-polymerizable Resin Compositions

Thermally-induced radical-polymerizable resin compositions were prepared by mixing and dissolving respective components in formulations and blending ratios as given in Tables 1 to 3 below. In Tables 1 to 3, numerical values are indicated by part by weight; the abbreviations C1 to C14 represent the radical-polymerizable resins obtained in Examples 1 to 9 and Comparative Examples 1 to 5, respectively; "decane diacrylate" refers to 1,10-decanediol diacrylate (bifunctional acrylate; supplied by Wako Pure Chemical Industries, Ltd.); "silane coupling agent" represents 3-acryloyloxypropyltrimethoxysilane (i.e., 3-trimethoxysilylpropyl acrylate); and "BPO" represents benzoyl peroxide (radical-polymerization initiator).

Example 46

Preparation of Photo-induced Radical-polymerizable Resin Composition

A photo-induced radical-polymerizable resin composition was prepared by mixing with and dissolving in 16 g of the radical-polymerizable resin (C7) obtained in Example 7, 2 g of 1,10-decanediol diacrylate (bifunctional acrylate; supplied by Wako Pure Chemical Industries, Ltd.) and 0.2 g of benzophenone (photo-induced radical-polymerization initiator).

Example 47

Production of Film-like Cured Materials

Each of the thermally-induced radical-polymerizable resin compositions obtained in Examples 10 to 45 was poured into a Teflon (registered trademark) mold (20 mm by 50 mm by 1 mm), dried in a vacuum dryer (at 40° C. for 10 minutes, full vacuum), cured by heating (at 140° C. for 10 minutes) in a N$_2$ atmosphere, and thereby yielded film-like cured materials.

Example 48

Production of Film-like Cured Material

The photo-induced radical-polymerizable resin composition obtained in Example 46 was poured into a Teflon (registered trademark) mold (20 mm by 50 mm by 1 mm), dried in a vacuum dryer (at 40° C. for 10 minutes, full vacuum), irradiated with an ultraviolet ray using a belt-conveyer type ultraviolet irradiator (UVC-02516SAA02, supplied by Ushio Inc.), and yielded a film-like cured material. The irradiation was performed at an irradiation energy of about 2 J and at a wavelength of 320 to 390 nm. The cured material after the irradiation with the ultraviolet ray was subjected to a heating treatment at 100° C. in an air atmosphere for one hour.

Example 49

Production of Fibrous Cured Material

The photo-induced radical-polymerizable resin composition (20 g) obtained in Example 46 was extruded from a syringe, the extruded composition was irradiated with an ultraviolet ray (at a wavelength of 365 nm), and yielded a fibrous cured material having diameters of from 50 to 2000 µm.

[Evaluation Tests]

(1) Adhesion Process of Silicon Wafer

Each of the thermally-induced radical-polymerizable resin compositions obtained in Examples 10 to 45 and Comparative Examples 6 to 15 was applied to each of substrates (a silicon wafer, a TEMPAX glass, an aluminum plate, and a PET film) using a spin coater so as to have a thickness of about 1 to 5 µm. The resulting coatings were dried in a vacuum dryer (at 40° C. for 10 minutes, full vacuum), followed by lamination and bonding (at 140° C. for 10 minutes) to give samples. The samples (bonded samples) were subjected to the following evaluations. The results are indicated in Tables 1 to 3, in which Specimens 1 to 5 represent the following samples.

Specimen 1: Sample including two plies of the silicon wafer bonded to each other Specimen 2: Sample including two plies of the TEMPAX glass bonded to each other Specimen 3: Samples including the silicon wafer and the TEMPAX glass bonded to each other Specimen 4: Sample including the aluminum plate and the TEMPAX glass bonded to each other Specimen 5: Sample including two plies of the PET film bonded to each other.

(2) Evaluation of how Bonding is

Each of the bonded samples (Specimens 3) including the silicon wafer and the TEMPAX glass bonded to each other was observed under a microscope, whether or not bubbles and/or separation occurred was examined, and how bonding is was evaluated according to the following criteria:

Criteria: A sample showing neither bubbles nor separation was evaluated as "good"; and a sample showing bubbles and/or separation was evaluated as "poor."

(3) Adhesive Strength

Each of the bonded samples (Specimens 1) including two plies of the silicon wafer bonded to each other was subjected to a peel test (delamination test). A sample which was bonded but could be delaminated by hand was evaluated as "Fair"; a sample which was not delaminated by hand but was delaminated at a bending stress of 7 $J/m^2$ or less in a four-point bending test was evaluated as "Good"; and a sample which was resistant to delamination at a bending stress of 7 $J/m^2$ or more in the four-point bending test was evaluated as "Very good (VG)."

(4) Heat Shock Test

Each of the bonded samples was subjected to a test of heating at 150° C. for 30 minutes and, immediately after the heating, immersing in liquid nitrogen, where the test was repeated a total of five times. The bonded samples after the tests were examined visually and under a microscope on whether or not separation, cracking (cracks), and any change in comparison to the samples before the tests occurred, followed by evaluation according to the following criteria.

Criteria: A sample showing neither separation nor cracking (cracks) was evaluated as "Good"; and a sample showing separation and/or cracking (cracks) was evaluated as "Poor." For Specimens 1, a sample without separation and cracking was evaluated as "Good." For Specimens 5, the heating was performed up to 140° C. in consideration of the thermal stability of the PET film.

TABLE 1

| | | Examples | | | | | | | | |
|---|---|---|---|---|---|---|---|---|---|---|
| | | 10 | 11 | 12 | 13 | 14 | 15 | 16 | 17 | 18 |
| Radical-polymerizable resin composition | C1 | 100 | | | | | | | | |
| | C2 | | 100 | | | | | | | |
| | C3 | | | 100 | | | | | | |
| | C4 | | | | 100 | | | | | |
| | C5 | | | | | 100 | | | | |
| | C6 | | | | | | 100 | | | |
| | C7 | | | | | | | 100 | | |
| | C8 | | | | | | | | 100 | |
| | C9 | | | | | | | | | 100 |
| | Decane diacrylate | | | | | | | | | |
| | Silane coupling agent | | | | | | | | | |
| | BPO | 1 | 1 | 1 | 1 | 1 | 1 | 1 | 1 | 1 |
| Evaluation on how bonding is | | Good | Good | Good | Good | Good | Good | Good | Good | Good |
| Adhesive strength | | Fair | Fair | Fair | Fair | Fair | Fair | Fair | Fair | Fair |
| Heat shock test | Specimen 1 | Good | Good | Good | Good | Good | Good | Good | Good | Good |
| | Specimen 2 | Good | Good | Good | Good | Good | Good | Good | Good | Good |
| | Specimen 3 | Good | Good | Good | Good | Good | Good | Good | Good | Good |
| | Specimen 4 | Good | Good | Good | Good | Good | Good | Good | Good | Good |
| | Specimen 5 | Good | Good | Good | Good | Good | Good | Good | Good | Good |

| | | Examples | | | | | | | |
|---|---|---|---|---|---|---|---|---|---|
| | | 19 | 20 | 21 | 22 | 23 | 24 | 25 | 26 | 27 |
| Radical-polymerizable resin composition | C1 | 80 | | | | | | | | |
| | C2 | | 80 | | | | | | | |
| | C3 | | | 80 | | | | | | |
| | C4 | | | | 80 | | | | | |
| | C5 | | | | | 80 | | | | |
| | C6 | | | | | | 80 | | | |
| | C7 | | | | | | | 80 | | |
| | C8 | | | | | | | | 80 | |

TABLE 1-continued

|  |  | | | | | | | | | |
|---|---|---|---|---|---|---|---|---|---|---|
|  | C9 |  |  |  |  |  |  |  |  | 80 |
|  | Decane diacrylate | 20 | 20 | 20 | 20 | 20 | 20 | 20 | 20 | 20 |
|  | Silane coupling agent |  |  |  |  |  |  |  |  |  |
|  | BPO | 1 | 1 | 1 | 1 | 1 | 1 | 1 | 1 | 1 |
| Evaluation on how bonding is | | Good | Good | Good | Good | Good | Good | Good | Good | Good |
| Adhesive strength | | Fair | Fair | Fair | Fair | Fair | Fair | Fair | Fair | Fair |
| Heat shock | Specimen 1 | Good | Good | Good | Good | Good | Good | Good | Good | Good |
| test | Specimen 2 | Good | Good | Good | Good | Good | Good | Good | Good | Good |
|  | Specimen 3 | Good | Good | Good | Good | Good | Good | Good | Good | Good |
|  | Specimen 4 | Good | Good | Good | Good | Good | Good | Good | Good | Good |
|  | Specimen 5 | Good | Good | Good | Good | Good | Good | Good | Good | Good |

TABLE 2

|  |  | Examples | | | | | | | | |
|---|---|---|---|---|---|---|---|---|---|---|
|  |  | 28 | 29 | 30 | 31 | 32 | 33 | 34 | 35 | 36 |
| Radical- | C1 | 100 |  |  |  |  |  |  |  |  |
| polymerizable | C2 |  | 100 |  |  |  |  |  |  |  |
| resin | C3 |  |  | 100 |  |  |  |  |  |  |
| composition | C4 |  |  |  | 100 |  |  |  |  |  |
|  | C5 |  |  |  |  | 100 |  |  |  |  |
|  | C6 |  |  |  |  |  | 100 |  |  |  |
|  | C7 |  |  |  |  |  |  | 100 |  |  |
|  | C8 |  |  |  |  |  |  |  | 100 |  |
|  | C9 |  |  |  |  |  |  |  |  | 100 |
|  | Decane diacrylate |  |  |  |  |  |  |  |  |  |
|  | Silane coupling agent | 1 | 1 | 1 | 1 | 1 | 1 | 1 | 1 | 1 |
|  | BPO | 1 | 1 | 1 | 1 | 1 | 1 | 1 | 1 | 1 |
| Evaluation on how bonding is | | Good | Good | Good | Good | Good | Good | Good | Good | Good |
| Adhesive strength | | Good | Good | Good | Good | Good | Good | Good | Good | Good |
| Heat shock | Specimen 1 | Good | Good | Good | Good | Good | Good | Good | Good | Good |
| test | Specimen 2 | Good | Good | Good | Good | Good | Good | Good | Good | Good |
|  | Specimen 3 | Good | Good | Good | Good | Good | Good | Good | Good | Good |
|  | Specimen 4 | Good | Good | Good | Good | Good | Good | Good | Good | Good |
|  | Specimen 5 | Good | Good | Good | Good | Good | Good | Good | Good | Good |

|  |  | Examples | | | | | | | | |
|---|---|---|---|---|---|---|---|---|---|---|
|  |  | 37 | 38 | 39 | 40 | 41 | 42 | 43 | 44 | 45 |
| Radical- | C1 | 80 |  |  |  |  |  |  |  |  |
| polymerizable | C2 |  | 80 |  |  |  |  |  |  |  |
| resin | C3 |  |  | 80 |  |  |  |  |  |  |
| composition | C4 |  |  |  | 80 |  |  |  |  |  |
|  | C5 |  |  |  |  | 80 |  |  |  |  |
|  | C6 |  |  |  |  |  | 80 |  |  |  |
|  | C7 |  |  |  |  |  |  | 80 |  |  |
|  | C8 |  |  |  |  |  |  |  | 80 |  |
|  | C9 |  |  |  |  |  |  |  |  | 80 |
|  | Decane diacrylate | 20 | 20 | 20 | 20 | 20 | 20 | 20 | 20 | 20 |
|  | Silane coupling agent | 1 | 1 | 1 | 1 | 1 | 1 | 1 | 1 | 1 |
|  | BPO | 1 | 1 | 1 | 1 | 1 | 1 | 1 | 1 | 1 |
| Evaluation on how bonding is | | Good | Good | Good | Good | Good | Good | Good | Good | Good |
| Adhesive strength | | VG | VG | VG | VG | VG | VG | VG | VG | VG |
| Heat shock | Specimen 1 | Good | Good | Good | Good | Good | Good | Good | Good | Good |
| test | Specimen 2 | Good | Good | Good | Good | Good | Good | Good | Good | Good |
|  | Specimen 3 | Good | Good | Good | Good | Good | Good | Good | Good | Good |
|  | Specimen 4 | Good | Good | Good | Good | Good | Good | Good | Good | Good |
|  | Specimen 5 | Good | Good | Good | Good | Good | Good | Good | Good | Good |

TABLE 3

|  |  | Comparative Examples | | | | | | | | | |
|---|---|---|---|---|---|---|---|---|---|---|---|
|  |  | 6 | 7 | 8 | 9 | 10 | 11 | 12 | 13 | 14 | 15 |
| Radical- | C10 | 100 |  |  |  |  |  | 80 |  |  |  |
| polymerizable | C11 |  | 100 |  |  |  |  |  | 80 |  |  |
| resin | C12 |  |  | 100 |  |  |  |  |  | 80 |  |
| composition | C13 |  |  |  | 100 |  |  |  |  |  | 80 |
|  | C14 |  |  |  |  | 100 |  |  |  |  | 80 |

TABLE 3-continued

|  |  | Comparative Examples | | | | | | | | | |
|---|---|---|---|---|---|---|---|---|---|---|---|
|  |  | 6 | 7 | 8 | 9 | 10 | 11 | 12 | 13 | 14 | 15 |
|  | Decane diacrylate |  |  |  |  |  | 20 | 20 | 20 | 20 | 20 |
|  | Silane coupling agent | 1 | 1 | 1 | 1 | 1 | 1 | 1 | 1 | 1 | 1 |
|  | BPO | 1 | 1 | 1 | 1 | 1 | 1 | 1 | 1 | 1 | 1 |
| Evaluation on how bonding is |  | Good | Good | Good | Good | Good | Good | Good | Good | Good | Good |
| Adhesive strength |  | Good | Good | Good | Good | Good | Good | Good | Good | Good | Good |
| Heat shock test | Specimen 1 | Poor | Poor | Poor | Poor | Poor | Poor | Poor | Poor | Poor | Poor |
|  | Specimen 2 | Poor | Poor | Poor | Poor | Poor | Poor | Poor | Poor | Poor | Poor |
|  | Specimen 3 | Poor | Poor | Poor | Poor | Poor | Poor | Poor | Poor | Poor | Poor |
|  | Specimen 4 | Poor | Poor | Poor | Poor | Poor | Poor | Poor | Poor | Poor | Poor |
|  | Specimen 5 | Poor | Poor | Poor | Poor | Poor | Poor | Poor | Poor | Poor | Poor |

INDUSTRIAL APPLICABILITY

Radical-polymerizable resins according to embodiments of the present invention have the aforementioned advantageous effects and are advantageous in various uses represented by stress-relaxation adhesives.

The invention claimed is:

1. A radical-polymerizable resin composition comprising a radical-polymerizable resin, a silane coupling agent, and a radically polymerizable monomer;
wherein the radical-polymerizable resin is obtained through cationic polymerization of a first compound in combination with a second compound, the first compound being at least one compound selected from compounds each represented by one of the following Formulae (1a) and (1b):

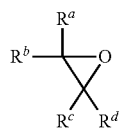

(1a)

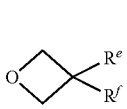

(1b)

wherein $R^a$, $R^b$, $R^c$, $R^d$, $R^e$, and $R^f$ are the same as or different from one another and each represent hydrogen atom or a hydrocarbon group having 1 to 20 carbon atoms and optionally containing an oxygen atom, where at least one of $R^a$, $R^b$, $R^c$, and $R^d$, and at least one of $R^e$ and $R^f$ are each independently a hydrocarbon group having 4 to 20 carbon atoms and optionally containing an oxygen atom, where at least two of $R^a$, $R^b$, $R^c$, and $R^d$, together with the adjacent one or two carbon atoms, may be linked to form a ring, and where $R^e$ and $R^f$, together with the adjacent carbon atom, may be linked to form a ring, and
the second compound being at least one compound selected from compounds each represented by one of following Formulae (2a) to (2f):

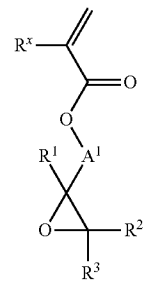

(2a)

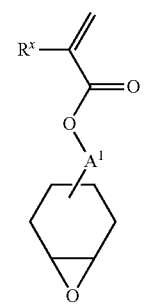

(2b)

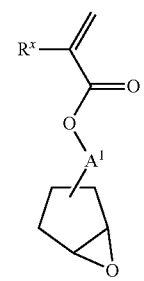

(2c)

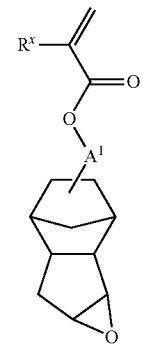

(2d)

(2e)

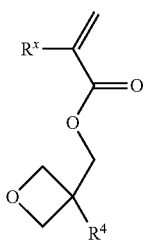

(2f)

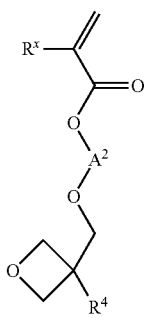

wherein $R^x$ represents hydrogen atom or methyl group; $R^1$, $R^2$, $R^3$, and $R^4$ each independently represent hydrogen atom or a hydrocarbon group having 1 to 5 carbon atoms; $A^1$ represents single bond, an alkylene group having 1 to 5 carbon atoms, an alkyleneoxyalkylene group having 1 to 5 carbon atoms, or an alkyleneoxy group having 1 to 5 carbon atoms, where the oxygen atom of the alkyleneoxy group is bound to the ring in the formula; and $A^2$ represents an alkylene group having 1 to 3 carbon atoms, and the radical-polymerizable resin being liquid at 0° C. and having a weight-average molecular weight of 500 or more;

wherein the silane coupling agent is represented by the following Formula (3):

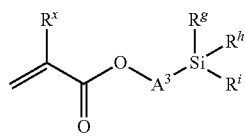

(3)

wherein $R^x$ represents hydrogen atom or methyl group; $A^3$ represents a hydrocarbon group having 1 to 20 carbon atoms; and $R^g$, $R^h$, and $R^i$ are the same as or different from one another and each represent an alkoxy group having 1 to 3 carbon atoms or an alkyl group having 1 to 3 carbon atoms, where at least one of $R^g$, $R^h$, and $R^i$ is an alkoxy group having 1 to 3 carbon atoms; and wherein the radically polymerizable monomer has two to six radically polymerizable functional groups.

2. The radical-polymerizable resin composition according to claim 1, further comprising an initiator for thermally-induced or energy-ray-induced radical polymerization.

3. The radical-polymerizable resin composition according to claim 2, comprising an organic peroxide as the initiator for thermally-induced radical polymerization.

4. A cured material obtained through radical polymerization of the radical-polymerizable resin composition of claim 1.

5. The cured material according to claim 4, in the form of a film or fiber.

6. A cured material obtained through radical polymerization of the radical-polymerizable resin composition of claim 2.

7. A cured material obtained through radical polymerization of the radical-polymerizable resin composition of claim 3.

* * * * *